(12) United States Patent
Hamilton

(10) Patent No.: US 6,889,227 B1
(45) Date of Patent: May 3, 2005

(54) DATABASE ACCESS BRIDGE SYSTEM AND PROCESS

(75) Inventor: Graham Hamilton, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 625 days.

(21) Appl. No.: 09/621,687

(22) Filed: Jul. 21, 2000

(51) Int. Cl.$^7$ .............................................. G06F 17/30
(52) U.S. Cl. ........................ 707/102; 707/10; 717/114; 717/137
(58) Field of Search .................... 707/1–10, 100–104.1, 707/200–206; 717/114, 137; 709/203–206, 217, 219, 310, 311–312

(56) References Cited

U.S. PATENT DOCUMENTS

| | | | | |
|---|---|---|---|---|
| 5,812,849 A | * | 9/1998 | Nykiel et al. ............... | 707/100 |
| 5,890,160 A | * | 3/1999 | Hembry ........................ | 707/10 |
| 5,899,990 A | * | 5/1999 | Maritzen et al. ................ | 707/4 |
| 6,269,373 B1 | * | 7/2001 | Apte et al. ..................... | 707/10 |
| 6,298,353 B1 | * | 10/2001 | Apte ........................ | 707/103 R |
| 6,338,068 B1 | * | 1/2002 | Moore et al. ................ | 707/102 |
| 6,557,100 B1 | * | 4/2003 | Knutson ...................... | 713/100 |

OTHER PUBLICATIONS

White et al., Enterprise Java Platform Data access, 1998, ACM, 504–505.*

* cited by examiner

Primary Examiner—Shahid Alam
Assistant Examiner—Jean Bolte Fleurantin
(74) Attorney, Agent, or Firm—Finnegan, Henderson, Farabow, Garrett, & Dunner, L.L.P

(57) ABSTRACT

A system or method enables a two tier computer application to operate in a three tier computer environment without specific programming for the three tier environment. Such a system or method receives a database call at a computer system and maps the database call to a general programming language call of a computer application. The general programming language call is executed to invoke functions of the computer application that correspond to functions of the database call. The general programming language call may be an Enterprise Java Bean (EJB) call. An application server receives the database call and maps the database call to the general programming language call. In response to executing the general programming language call, the application server generates a second database call to the database that may either correspond directly or indirectly to the database call received at the application server. The database calls may both be SQL calls. The general computer programming language may have EJB components that are analyzed to determine the correspondence between the database elements and the elements of the components that access the database elements. Methods of the EJB components may be identified for use in determining the correspondence. The methods may be identified by searching for a method of the form <command prefix>XXX, where the prefix is a "get" or "set" method.

38 Claims, 15 Drawing Sheets

| First Name | Middle Name | Last Name | Employee ID | Salary | Position Level |
|---|---|---|---|---|---|
| John | Thomas | Doe | 456789 | 60,000 | J2 |
| Jane | Mary | Doe | 234567 | 80,000 | J4 |

FIG. 3

DATABASE ACCESS BRIDGE SYSTEM AND PROCESS

TECHNICAL FIELD

The present invention relates to database access systems, and more particularly, to a database access system in a three tier computer system environment.

BACKGROUND

In order to keep up with the increased demand for computer applications, computer application developers have created tools to help in the development of computer programs, such as visual builder tools or application builder tools. These tools generally include standard sets of software modules that may be interlinked to create custom-built applications.

One such widely used object-oriented visual builder tool is Visual Basic available from Microsoft Corporation of Redmond, Wash. Visual Basic has a graphical user interface (GUI) that facilitates the development of computer applications, such as database access applications. The GUI includes a "toolbox," a "form window," and a "property sheet." A toolbox typically contains icons or text which represent different classes of components or software modules. An example of different classes may include complex components (e.g., database viewers) and simple components (e.g., buttons). An application may be composed in the form window by selecting a component from the toolbox and placing it within the form window. A developer graphically composes an application by interlinking components in the form window. The components are interlinked based on properties or attributes relating to the selected component as displayed in the property sheet. The properties may include information relating to the size, color, and name of the selected component.

Many Visual Basic developers have substantial experience with two tier environments that involve applications for direct querying or access to a database. In a two tier environment, a client computer system (first tier) directly communicates with a database system (second tier) to access data. The second tier is often a relational database that uses Structured Query Language (SQL) as the protocol language for communicating with other systems.

With the advent of the Internet and the use of application servers, three tier environments are becoming more popular. In a three tier environment, a client system (first tier) has a GUI that communicates with an application running on an application server (second tier) which in turn communicates with a database server (third tier) for access to and storage of data. Because three tier environments enable business applications on the second tier to be modified without having to substantially modify each client system, a three tier environment may be more efficiently: maintained and updated than a two tier environment that generally requires each client application to be modified when changes are desired. This advantage of the three tier environment has made many businesses consider switching to three tier systems.

One consideration businesses take into account when switching to different computer systems is the cost of training required for the developers and technical staff. For companies that have a significant number of developers trained only in two tier system language protocols, switching to a three tier environment may result in these developers not being able to use many of their previously learned skills. As a consequence, many businesses may be reluctant to switch to a three tier environment due to training time and cost concerns. Furthermore, programmers may be reluctant to learn a new computer language. For example, these developers may not be versed in the Java™ programming language which is becoming the standard in many three tier environments. The Java™ programming language is suited for use in a three tier environment due to programming conventions such as Java™ Beans (JB) and Enterprise Java™ Beans (EJB). EJB components may link other EJB components or may be designed to perform customized operations when invoked or called.

Some conventional systems enable applications, such as Visual Basic applications, to operate in conjunction with a three tier environment. However, these systems require the Visual Basic application developer to learn a complex protocol interface language, such as DCOM, to interact with an application or middle tier server. Consequently, these application developers may be reluctant to learn a complex protocol interface language in order to develop applications that operate in a three tier environment. Given the existing skill base for programming in two tier environments, there is a need for a method and system that enables computer program developers to continue to use their existing two tier skills in a three tier environment, without learning new computer programming protocols or languages.

SUMMARY OF INVENTION

Generally described, the systems and processes consistent with the present invention enables a database call to be converted to a general programming language call which in turn invokes another corresponding database call. By use of such a system or process, a computer application designed to operate in a two tier computer environment may operate in a three tier computer environment, without specific programming for the three tier computer environment.

More specifically, one aspect consistent with the present invention receives a first database call at a computer system and maps the database call to a general programming language call of a computer application. The general programming language call is executed to invoke a second database call that corresponds to the first database call. The general programming language call may be an Enterprise Java™ Bean (EJB) call and the first and second database calls may be Structured Query Language (SQL) calls. An application server may receive the first database call from a client computer system and map the first database call to the general programming language call. In response to executing the general computer language programming call, the application server generates the second database call to the database that may either correspond directly or indirectly to the database call received at the application server.

To develop a database bridge map for mapping first database calls to the general programming, language, EJB components, which may be stored at the application server, are analyzed to determine which elements of the components are used to access the database elements. Particularly, methods of EJB components are analyzed. Methods of the EJB components may be identified for use in determining the correspondence with database elements by searching for a method of the form <command prefix>XXX, where the prefix is a "get" or "set" method. In the Java™ programming language, "get" methods read database elements and "set" methods write to or change database elements. Design patterns, as defined in the Java programming language, may be used to identify the "get" and "set" methods of the components. After the names of "get" and "set" methods are identified for accessing the database, the database bridge map is created for converting the first database calls to the general programming language (e.g. Java™).

In another aspect consistent with the present invention, software components for accessing a database associated with an application server are exposed as elements of the database. When a database protocol command initiated from a first programming language is received at the application server, the database protocol command is converted to a command syntax of a second computer programming language corresponding to a selected software component. The database is accessed with the selected software component.

In another aspect consistent with the present invention, a system for interfacing between a computer and a database is provided. The system includes a command converter operative to convert a first database call received from the computer to a general computer programming language call that corresponds to the database call. After executing the general computer programming language call, a second database call that corresponds to the first database call, is generated to access the database.

The system may be an application server that receives the first database call from a client computer. The database may be accessed through a database server and the first and second database calls may be SQL calls. The command converter may be a mapping module that maps the first database call to the general computer programming language call which then executes the second database call.

BRIEF DESCRIPTION OF THE DRAWINGS

FIG. 3 is an example of information of a database that may be used in conjunction with an embodiment consistent with the present invention;

DETAILED DESCRIPTION

A. Overview

Systems and methods consistent with the present invention receive database protocol commands at an application server and convert those database protocol commands to general computer programming language commands that may be executed at the application server. The executed commands access a database via the rules and logic implemented in the general computer programming language. Such systems and methods expose software components residing on the application server as database fields so that a client computer system can communicate with the application server as though the client computer system is accessing a database. The application server receives the database protocol commands or queries from the client computer system and a database bridge converts the database protocol commands to general computer programming language commands of applications running on the application server. The database protocol commands are converted to commands that correspond to the action specified by the received database protocol command. The converted commands are executed on the application server to access the database.

A system or method consistent with the present invention may use the Java™ programming language, particularly Enterprise Java™ Beans (EJB), for accessing a database. Java™ Beans is an object-oriented component architecture that enables the creation, assembly, and use of dynamic Java components. A Java component is the reusable software component module. Java™ Beans defines a standard set of interfaces and behaviors that enable a developer to build reusable Java components. The components can be linked together to create applets, applications or new beans for reuse by others.

When used in connection with the present invention, EJB components or objects may be utilized at the application server to access the database server. A database bridge exposes the EJB relationships for accessing the database as data fields. The database bridge serves as the interface between the database queries from clients and applications at the application server.

In order to expose the database fields that are accessed by the EJB components to a client application, a computer program module is executed that evaluates the EJB components at an application server to determine the properties or fields associated with the EJB components. These fields are then mapped to appropriate EJB components and are exposed to the client ON, computer system. Thus, when the client computer system attempts to access a database field, the request from the client is executed against the created map to determine the corresponding EJB command (e.g. method) for accessing the database field. The EJB command is invoked at the application server and performs the desired operation on the database field desired by the client computer system.

B. Architecture

Figure 1:
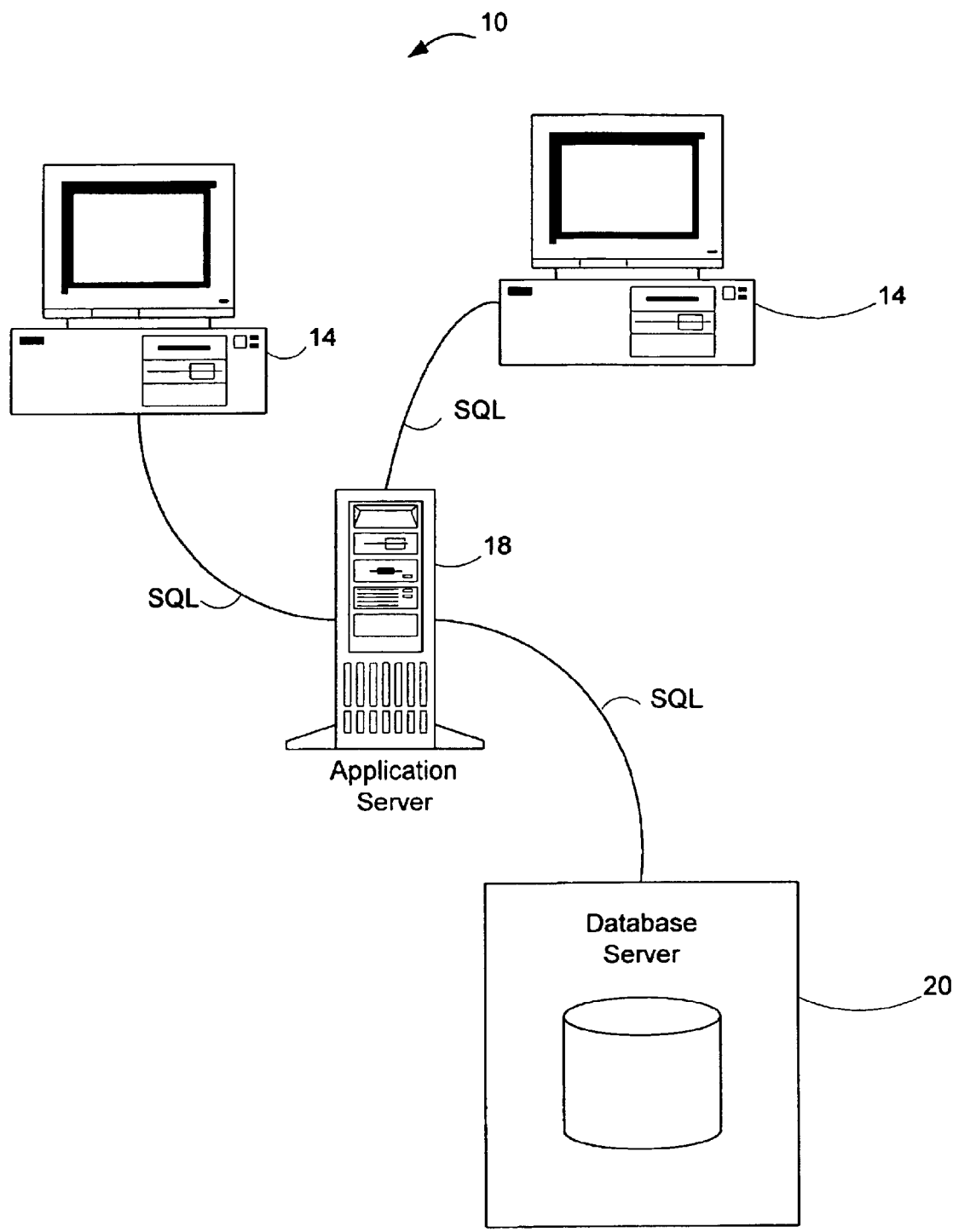
FIG. 1, is a diagram of a network system consistent with the present invention.

Referring to FIG. 1, a database bridge system 10 consistent with the present invention is illustrated. The database bridge system 10 includes client computer systems 14, an application server 18, and a database server 20. The client computer systems 14 communicate in a database access protocol, such as SQL, to the application server 18, which then translates the database protocol commands to application logic that in turn produces another set of SQL commands for transmission to database server 20.

Typically, in a two tier client-server environment, the client applications establish a direct connection with a database server, such as a SQL server, to submit queries to the server. The client typically makes connection with the server over a local area network (LAN) or a wide area network (WAN). The client submits these queries in an SQL format to a database engine for processing and receives the results returned from the engine. The SQL protocol command is formatted as a tabular data stream (TDS).

In the database bridge system 10, the application server 18, instead of a database server, receives the SQL protocol command (call) from the client. The application server 18 then converts the SQL protocol command to a programming language call, such as Java™ (e.g. using Enterprise Java™ Beans), and executes the Java programming language according to business rules and logic at the application server 18. The business rules and logic at the application server 18 may provide database access constraints, provide access verification to database fields, or any other desired processing requirements for database access and processing.

When the client computer system 14 sends requests to access certain information from the database, such as an employee's salary, the application server 18 converts the SQL request for obtaining the employee's salary to an EJB method for obtaining the salary from the SQL server. The application server 18 then executes the EJB component corresponding to the EJB method to produce an SQL command that accesses the database server 20. EJB components for interfacing with the database 20 may be generally referred to herein as the EJB layer. The view of database fields (e.g. field names and structure) that the client application operates on (sees) may be different than the underlying field names used in the EJB layer for accessing information in the database. For example, a Visual Basic application may be defined to perform an update on a patient's "weight" field, but after processing through the EJB layer, the EJB component updates a patient's "size" field. When the EJB component executes, an SQL command is produced to the database server 20 to retrieve the information requested by the client computer system 14.

For simplicity of the drawings, many components of computer systems and servers have not been illustrated, such as address buffers and other standard control circuits because these elements are well known in the prior art and are not necessary for understanding the present invention. Computer programs and modules used to implement the various steps of the present invention are generally located in a memory unit, and the processes consistent with the present invention are carried out through the use of a central processing unit (CPU) in conjunction with application programs or modules. Those skilled in the art will appreciate that the memory unit is representative of both read-only memory and random access memory, or other memory elements used in a computer system. The memory unit also contains databases, tables, and files that are used in carrying out the processes associated with embodiments of the present invention. The CPU, in combination with computer software and an operating system, controls the operations of the computer system. The memory unit, CPU, and other components of the computer system communicate via a bus. Data or signals resulting from the processes of the present invention are received and output from a computer system or server via an input/output (I/O) interface.

Figure 2:
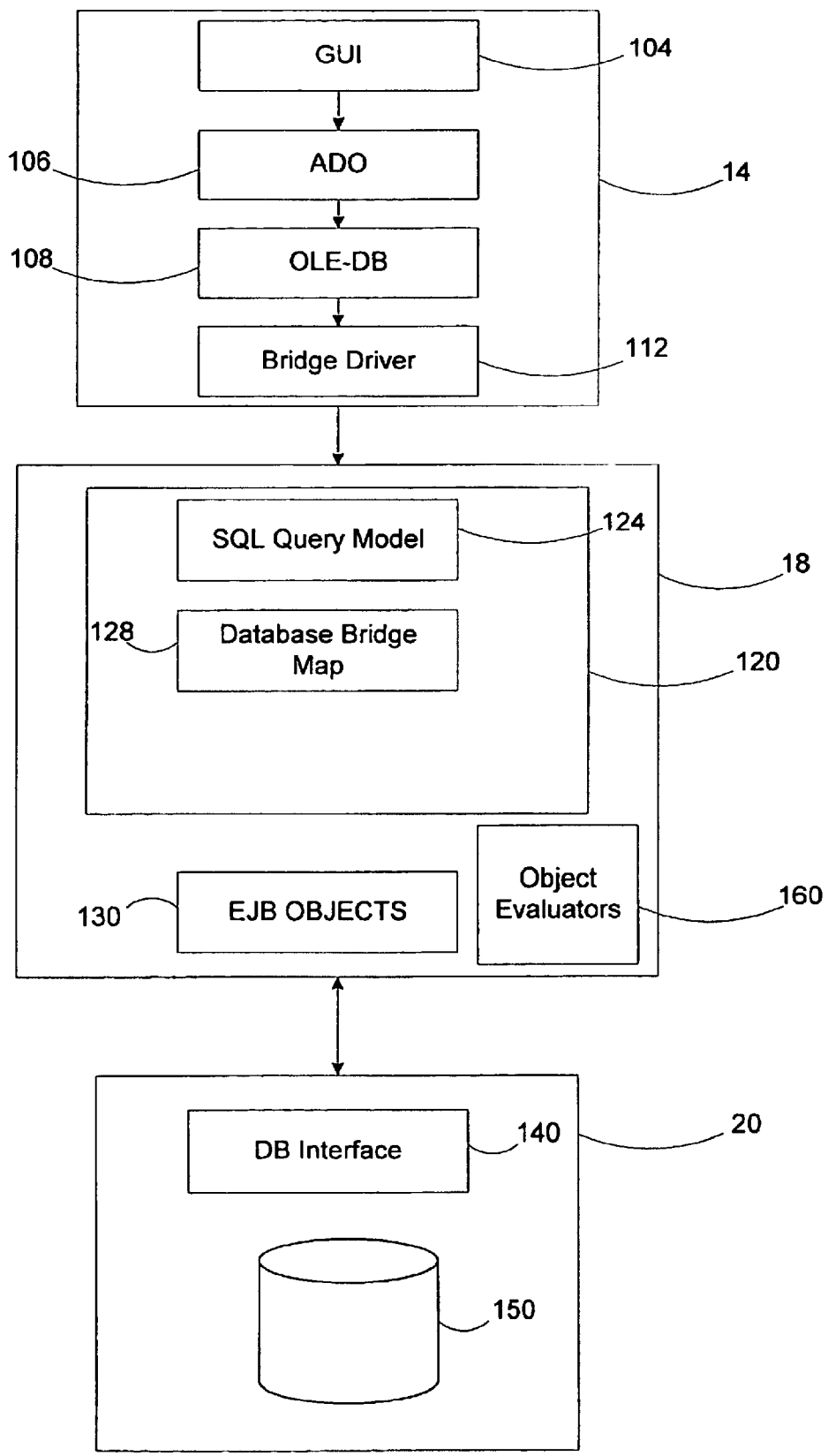
FIG. 2 is a more detailed view of the components of the network system of FIG. 1.

Referring to FIG. 2, application program modules stored in the memory of a client computer system 14, application server 18, and database server 20 are illustrated. As discussed above, the client computer system 14 communicates with the application server 18 in a database access protocol language as though the application server 18 is a database. In essence, the application server 18 is presented to the client computer system 14 as a database. Applications at the application server 18 convert the database access protocol commands to appropriate general programming language commands which are executed to access and operate on the data as specified by client computer system 14.

The client computer system 14 contains a client application 104, such as a GUI, that permits a user to interface with the application server 18. The client application 104 may be Visual Basic, for example. This Visual Basic application may use Microsoft database access technology ADO (ActiveX Data Objects) API 106, which is in turn built upon the Microsoft OLE-DB interface 108. OLE-DB is a Microsoft COM API for database access. The Microsoft OLE-DB interface uses database drivers to talk to target databases. In this case, the database driver is a bridge driver 112 that forwards the database requests to the database bridge running in application server 18. The application server 18 contains EJB objects 130 that process SQL queries from the client application 104. The SQL queries are processed through an SQL bridge or database bridge 120 that provides the interface between the client application 104 and EJB objects 130. The database bridge 120 may be defined as a "bridge" class to implement its database protocol command conversion functions. The bridge class contains a query model, such as a SQL query model object 124 to process queries from the client application 104. The SQL query model object 124 may be a "finder" interface, as defined in EJB. The SQL bridge 120 contains a database bridge map 128 that has methods for mapping commands between the client application 104 and EJB objects. After the SQL protocol commands are mapped to EJB objects 130, the objects are executed and the EJB objects 130 develop and send queries to the database 110 server 20. A database interface 140 processes the SQL query and accesses the database 150. The data of an SQL database is relational. That is, the database stores information in a table or relation format. A table has a set of rows and columns with columns defining fields in a row, and rows defining a collection of fields that represents one instance or record of data.

The EJB objects 130 have methods and properties defined for accessing the appropriate tables and fields of the database. However, the client application does not have direct access to the database, but instead has access through the EJB objects. As a consequence, a map is created to correlate queries or commands from the client application to EJB objects for executing those commands. In order to map. SQL protocol commands to EJB objects to access the database, the properties and methods of the EJB objects that are used to access the database are determined to create the database bridge 120.

An object evaluator 160 determines the properties and methods of the EJBs. Each time an EJB object is added to the EJB objects 130 for accessing database elements, the methods and properties of the EJB objects are determined by the object evaluator 160. The object evaluator 160 is executed to identify "getXXX" and "setXXX" methods in the target EJB and then these methods are mapped as properties in the database bridge 120 to correspond to the database field that the method operates on. The properties are exposed as SQL fields in the database bridge 120. The operation of the object evaluator 160 is described in more detail below in connection with FIGS. 8–15.

The EJB objects 130 may add a layer of abstraction to the data stored in the database. For example, the EJB objects may add constraints between fields or may provide higher level semantics. The database bridge 120 provides a database or SQL view onto the EJB objects. Consequently, an application tool, such as Visual Basic, "believes" it is talking SQL to a database, although it is actually communicating to an EJB application server that is adding a layer of abstraction, which then communicates with the database.

Referring to FIG. 3, an employee table for storing employee information in database 150 is illustrated. The employee table contains rows of employee data that have six columns or fields: first name, middle name, last name, employee ID, salary, and position level. The data stored in the employee table is accessed by executing the EJB objects 130 of the application server 18. The executed EJB objects are converted into a data manipulation language, such as SQL, to formulate a query to access the database. For example, a query can be used to retrieve all rows of the employee table, selected rows of the employee table, or selected fields. In addition to storing application data, the database 150 uses tables to store schema data, or meta data. Meta data contains information that describes the structure of the data stored: in a database. For example, meta data identifies the tables contained in the database and the specifications for the columns in each table.

Figure 4:
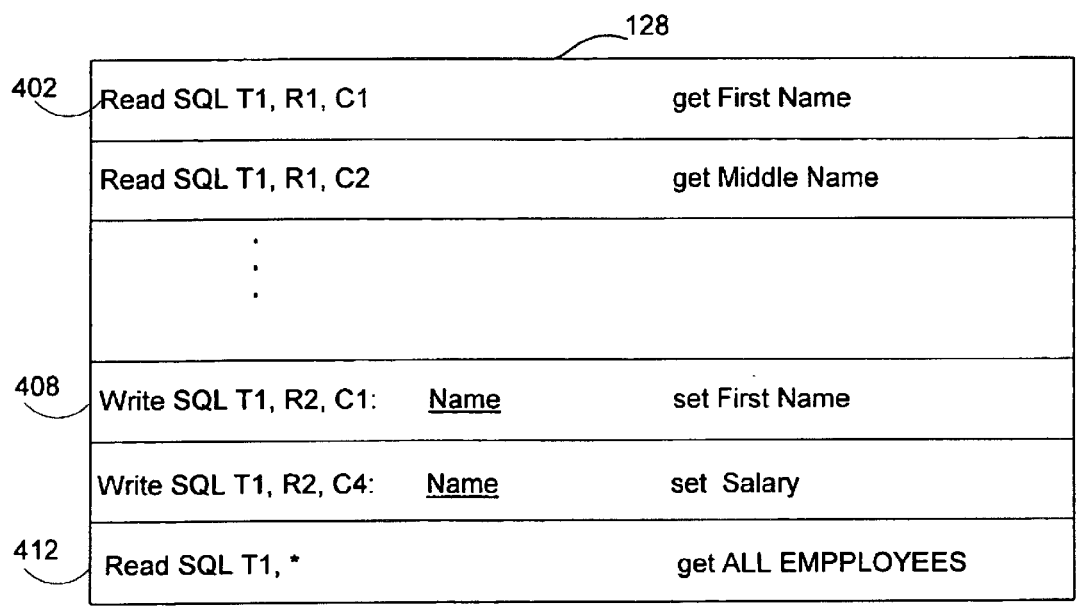
FIG. 4 is a diagram of a database bridge map consistent with an embodiment of the present invention.

Referring to FIG. 4, an example of a database bridge map is illustrated. In a map consistent with the present invention, the database bridge map 128 maps SQL commands to EJB methods/properties. The database bridge map 128 contains SQL commands that may be initiated from a client computer system 14 to retrieve information from within the database 150. The database bridge map 128 maps EJB methods and properties, used to invoke a designated function in the database, to the SQL commands that perform the functions and to the database elements that are the target of the function. Thus, when the application server 18 receives an SQL command from the client computer system 14, the SQL command is matched to an EJB method that when executed performs the desired operation on the appropriate database element. The SQL commands, as represented in the table, specify a table, T, row, R, column, C, or universal character, such as "*", that is used for requesting multiple elements in a single command. For example, if a client computer system initiated, from Visual Basic, a "select FirstName" command that command would be converted to an SQL command, such as SQL command 402. The SQL command 402, for example, is a database read command that reads table 1, row 1, column 1. The SQL command 402 is mapped to a "getFirstName" method of a corresponding EJB and the "getFirstName" method is executed at the application server 18. The employee first name of the database 150 that corresponds to the "getFirstName" method is returned to the application server 18 for transmission to the client computer system.

The SQL command 408 is an example of a command that writes data to a field of the database 150. The SQL command 408 may be generated from a client computer system 14 in an application, such as Visual Basic, when an "update FirstName" command is executed. The SQL command 408, as received from a client computer system 14, updates table 1, row 2, column 1 which is the first name of the second employee listed in table 1 of the database 150. The SQL command 408 is mapped to a "set" EJB method, such as "setfirstName", to modify the first name of the employee as specified in the command. In addition to a single "read" or "write" command, an SQL command may be a global or universal command, such as the SQL command 412 that reads and returns all employee names. The SQL command 412, which originates from a "select Allemployees" method of a client application, is mapped to a "getAllemployees" EJB method. Thus, when the SQL command 412 is received the "getAllemployees" method is executed at the application server 18 in order to retrieve all employee data of table 1 of the database.

Figure 5:
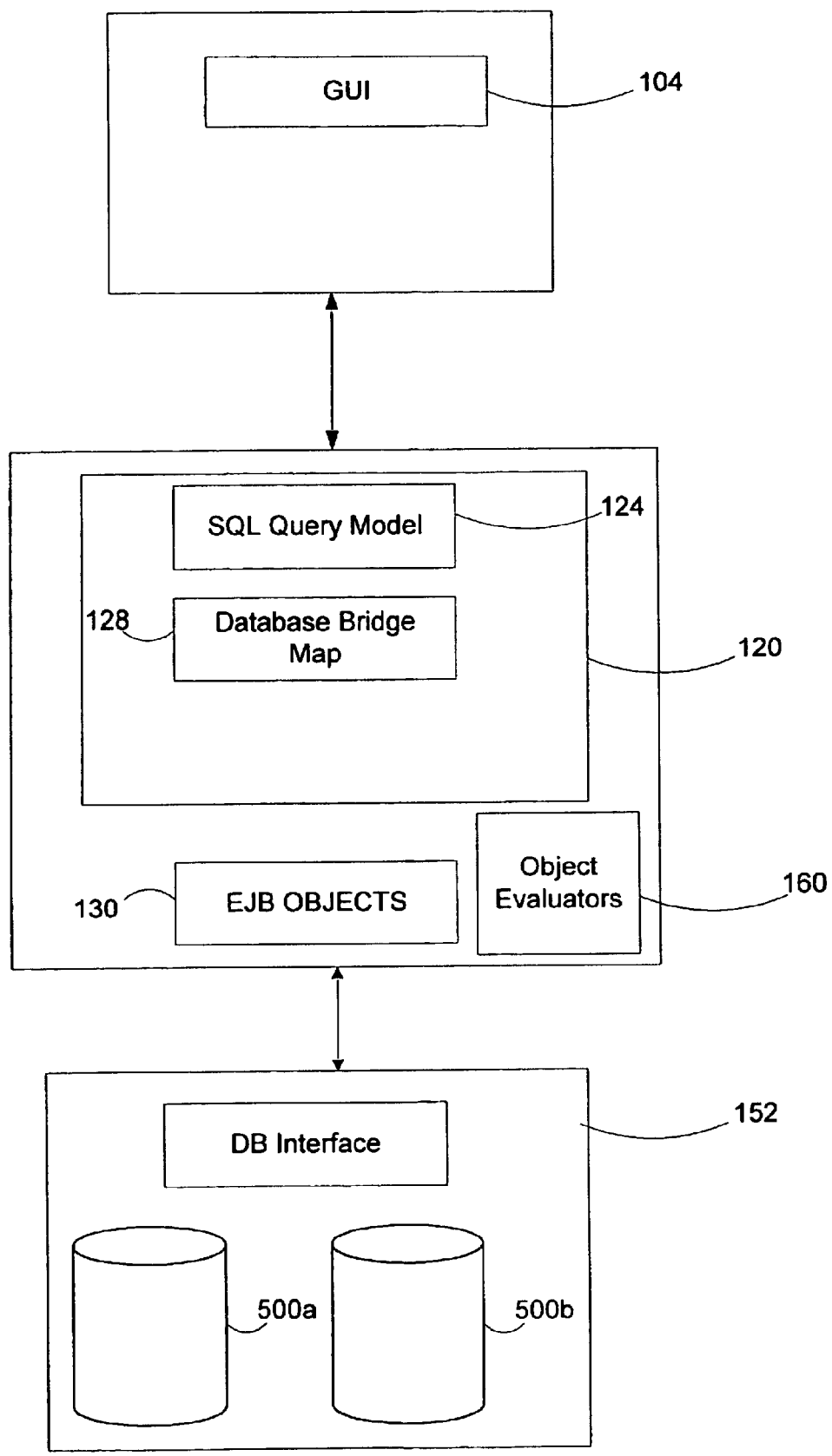
FIG. 5 is a detailed view of another embodiment of a database server system of FIG. 1.

Referring to FIG. 5, a diagram of a system consistent with the present invention is illustrated that has a database server 152 that accesses two databases 500a and 500b. Many companies, for various reasons, developed databases to separately store different types of information, such as employee information, but decided that being able to access the separately stored information with a single request would be better. For example, a company may have an employee payroll database and an employee vacation database that the company desires to access as a unified set of information. In this situation, a program developer develops a single EJB that accesses each database. The EJB would have a "getvacation" method and "getSalary" method that would be routed to the separate databases when the EJB method is invoked. As discussed above, the object evaluator 160 exposes methods of EJBs and, in this case, the object evaluator 160 is executed with respect to the single access EJB to expose the separate database access methods of the single access EJB object. The exposed methods are used to produce or update the database bridge map 128. In this example, because the databases may have fields or database elements that are duplicated, such as an employee name, an EJB may be written that updates more than one column or database in response to a single update command received from the client. Similarly, the incoming SQL call may specify different columns and/or table layouts than the SQL sent to the underlying database or databases.

C. Processes

Figure 6:
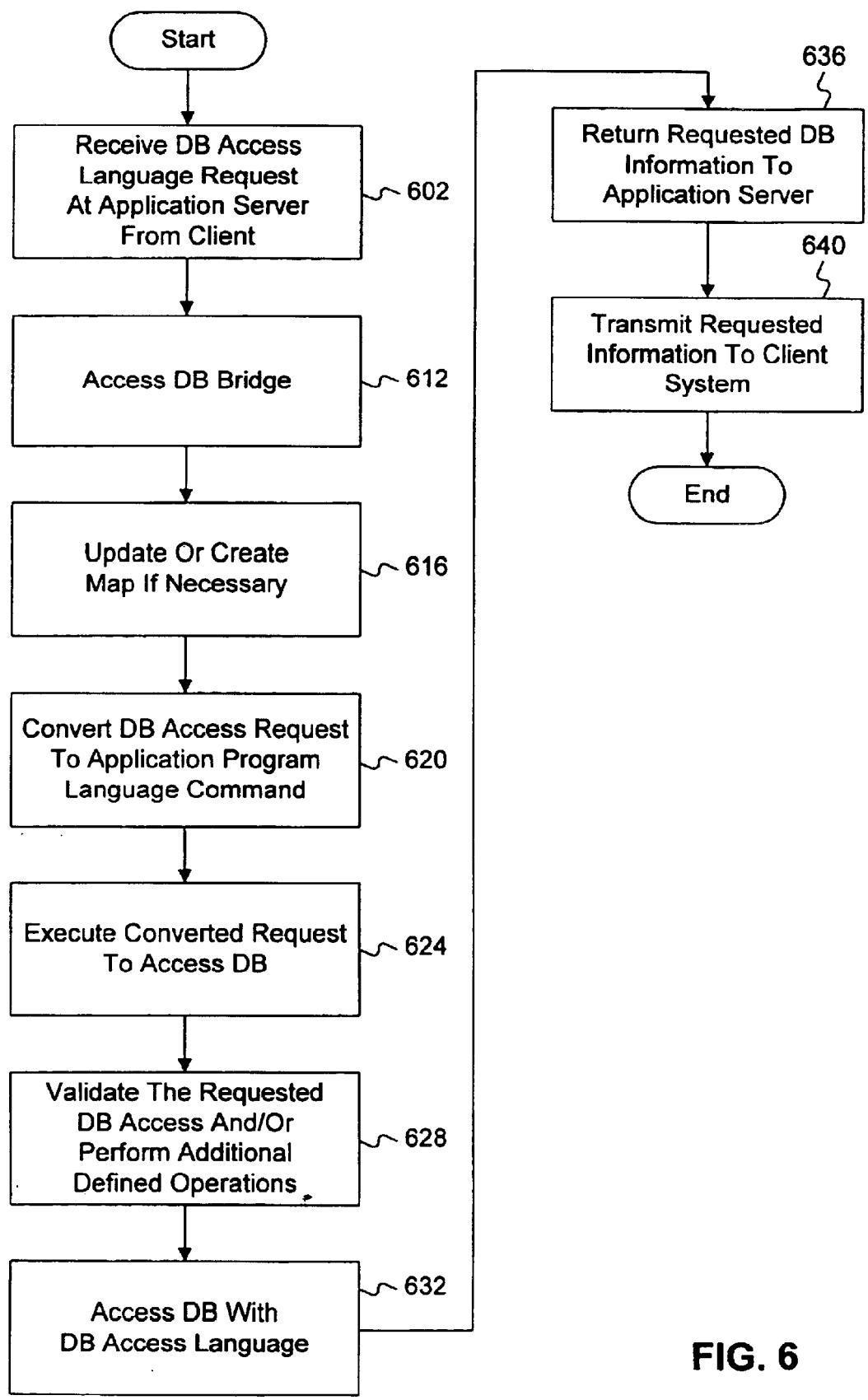
FIG. 6 is a flow diagram of processes consistent with the present invention for converting database protocol commands to general computer programming language commands.

FIG. 6 is a flow diagram of the processes that enable database protocol commands to be converted to application commands at an application server for processing. A client computer system programmed to operate in a two tier computer system environment may operate in a three tier environment via processes consistent with the present invention, as discussed in connection with FIG. 6. When a system consistent with the present invention intercepts a database protocol request from a client computer system 14 to access a database (step 602), the system accesses the database bridge (step 612). If a database bridge map 128 has not been created or if an EJB has been added to the EJB objects for accessing the database (step 616), the database bridge map 128 is updated or created as discussed in connection with FIG. 7. If the database bridge map has been created for the EJB objects and all new EJB objects have been included in the database bridge map (step 616), the process proceeds to convert the database access request to an application program language command, such as an EJB method for accessing the database (step 620).

After a database access request has been converted to an EJB method, the EJB method is executed (step 624). Application logic at the server may validate that the request is allowed or may perform some additional operations with respect to the request that is defined for the system (step 628). After operations defined by EJB logic has been completed at the application server 18, the database is accessed from the application server 18 with a database protocol language corresponding to the database access request from the client computer system (step 632). The database returns the requested database information to the corresponding to the original client computer system request to the application server (step 636). The application server 18 transmits the information returned from the database to the client computer system 14 (step 640).

Figure 7:
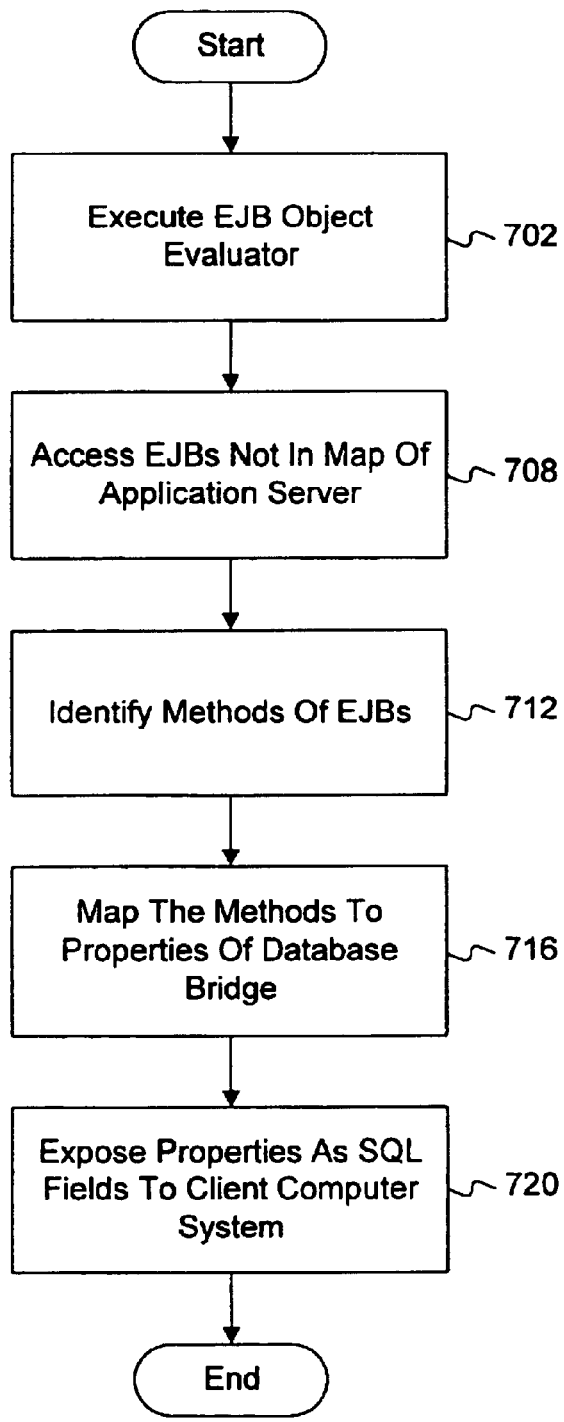
FIG. 7 is a flow diagram of processes consistent with the present invention for creating a database bridge map.

FIG. 7 is a flow diagram of the processes of the object evaluator 160 for defining elements to be included in the database bridge map 128. The database bridge map 128 can be created or updated prior to any requests being initiated from a client computer system 14 or may be updated or created in real time when the application server receives a database request from the client computer system. With the Java programming language, programs can be compiled at run time and consequently the database bridge may be updated or created when a request from the client computer system is received. When the object evaluator is invoked to update or create a database map (step 702), the EJBs that are used in the database access process and that have not been included as part of the database map are accessed (step 708). The object evaluator may use a reflection process and design patterns, as discussed below, to identify methods of the EJBs that are used to access the database (step 712). The methods are mapped as properties (step 716) of the database bridge 120 to correspond to SQL commands that the methods access as discussed herein (see e.g. FIG. 4). The properties of the bridge are exposed to the client computer system as SQL fields (step 720), so that SQL requests can be converted to general programming language commands, EJBs, for execution at the application server.

The process of the object evaluator 160 for determining the methods of Java Beans that are used to access a database is discussed in more detail below. As discussed above, the methods of Java Beans used to access database are determined so that these methods can be exposed as properties of bridge class that maps SQL commands to these properties. This process is discussed in detail with respect to Java™ Beans, but it should be appreciated that other programming conventions may be used to implement the following process.

When applications, such as database access applications at the application server 18, are composed using application builder tools which manipulate software components, e.g., Java™ Beans, the application builder tool analyzes the components to determine the methods, properties, and events associated with the component. A Java™ Bean component that is a part of a Java™ Bean class may have an associated class which specifies details pertaining to the methods, properties, and events of the Java™ Bean. This class is known as a "BeanInfo" class, which may be considered to be an information class. The BeanInfo class typically includes strings which provide descriptive names that may be used to provide information about, or otherwise identify, the methods, properties, and events associated with a Java™ Bean. In general, a Java™ Bean will have a visual representation, or a representation that may be displayed as part of a graphical user interface. However, it should be appreciated that in some embodiments, the Java™ Bean will not have a visual representation, but will instead be modifiable using standard property sheets or the like.

As properties and events are typically identified by groupings of methods, a BeanInfo class, or an object that is a part of a BeanInfo class, generally includes methods that describe the Java™ Bean. Although the BeanInfo class may include any number of methods, the BeanInfo class consistent with the present invention may include the following methods: a method which returns other BeanInfo objects that have information relating to the current, or associated, Java™ Bean ("getAdditionalBeanInfo"); a method which provides overall information about the current Java™ Bean ("getBeanDescriptor"); a method which returns an index of a default event ("getDefaultEventIndex"); a method which returns an array which describes the events which may be exported by the current Java™ Bean ("getEventSetDescriptors"); a method that returns an array of externally visible, e.g., public, methods supported by the current Java™ Bean ("getMethodDescriptors"); and, a method that returns an array of editable properties supported by the current Java™ Bean ("getPropertyDescriptors").

An application builder tool or other tool which analyzes a Java™ Bean may be provided with an Introspector class, as defined in Enterprise Java Beans. The Introspector class includes information relating to various design patterns and interfaces which are used with the process of introspection. Further, the Introspector class enables the BeanInfo object which describes a particular Java™ Bean to be obtained. In order to gather information relating to methods, properties, and events that are supported by a Java™ Bean, e.g., a target Java™ Bean, an Introspector typically analyzes the class, e.g., target class, with which the Java™ Bean is associated to determine if a corresponding BeanInfo class exists. In the event that a BeanInfo class exists, the Introspector uses information obtained from the BeanInfo class, in the determination of how to present the Java™ Bean.

It should be appreciated that a BeanInfo class may not exist for a particular Java™ Bean. If a BeanInfo class does not exist, an application builder tool may identify the methods, properties, and events associated with the Java™ Bean by using an automatic analysis, or a combination of a "reflection" process and a "design pattern" analysis. A reflection process, as is well known to those skilled in the art, generally involves studying parts of a software component, e.g., a Java™ Bean, that is a part of a program at run-time to determine the methods that are associated with the software component, such as a component to access a database. A design pattern is a pattern, or a syntax, that characterizes a particular method. Hence, a design pattern analysis is the analysis of syntaxes in order to identify the methods associated with a software component. As properties and events are usually identified by groupings of methods, a design pattern analysis also serves to identify properties and events. Generally, automatic analysis uses a reflection process to determine methods, such as "get" and "set" methods that are supported by a Java™ Bean, then applies design patterns to determine, based on the methods, which properties (e.g. FirstName, LastName, etc.), events, and public methods are supported. The use of automatic analysis enables methods and, therefore, properties and events, to be efficiently identified in the event that a BeanInfo class does not exist for a particular Java™ Bean. It should be appreciated, however, that even if a BeanInfo class exists, automatic analysis may also be used.

Figure 8:
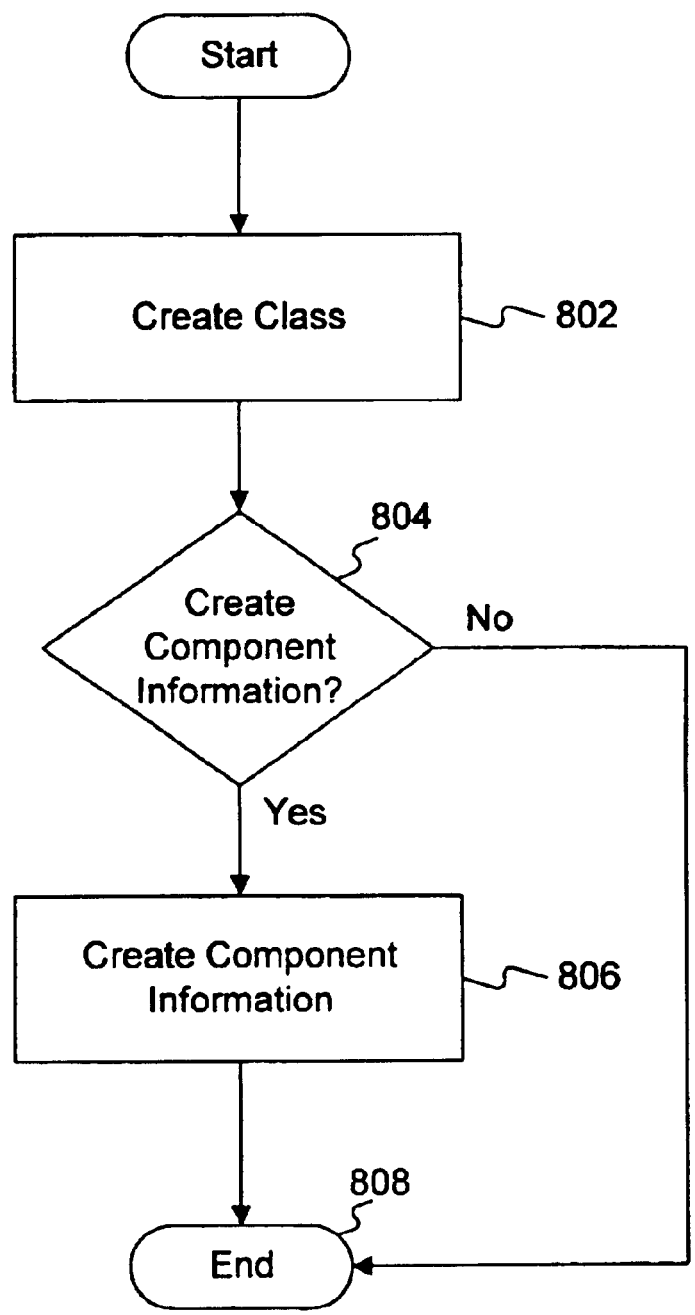
FIG. 8 is a flow diagram of a process consistent with the present invention for creating an object-oriented component consistent with the present invention.

If a component is to include information pertaining to methods, properties, and events that are associated with the component, a class for the component information is created at the time the class is created. FIG. 8 is a flow diagram that illustrates the steps associated with creating a new class. After a new object class is created (step 802), a determination is made (step 804) whether component information, such as a "BeanInfo" object, is to be created. The component information may generally include properties, methods and events for a component, or an instance of the class created.

If it is determined (step 804) that component information does not need to be created, then the process of creating a new class ends (step 808). On the other hand, if it is determined (step 804) that the creation of component information is necessary or beneficial, the component information is created (step 806). The BeanInfo object may include a "getBeanDescriptor" method which provides overall information, e.g., a display name, about the bean class. After component information is created, the process of creating a new class is completed (step 808).

The determination of which methods, properties, and events are associated with a class may occur sequentially, i.e., the methods, properties, and events may be identified in separate processes. Alternatively, the methods, properties, and events may be identified together as a part of a single process.

Figure 9:
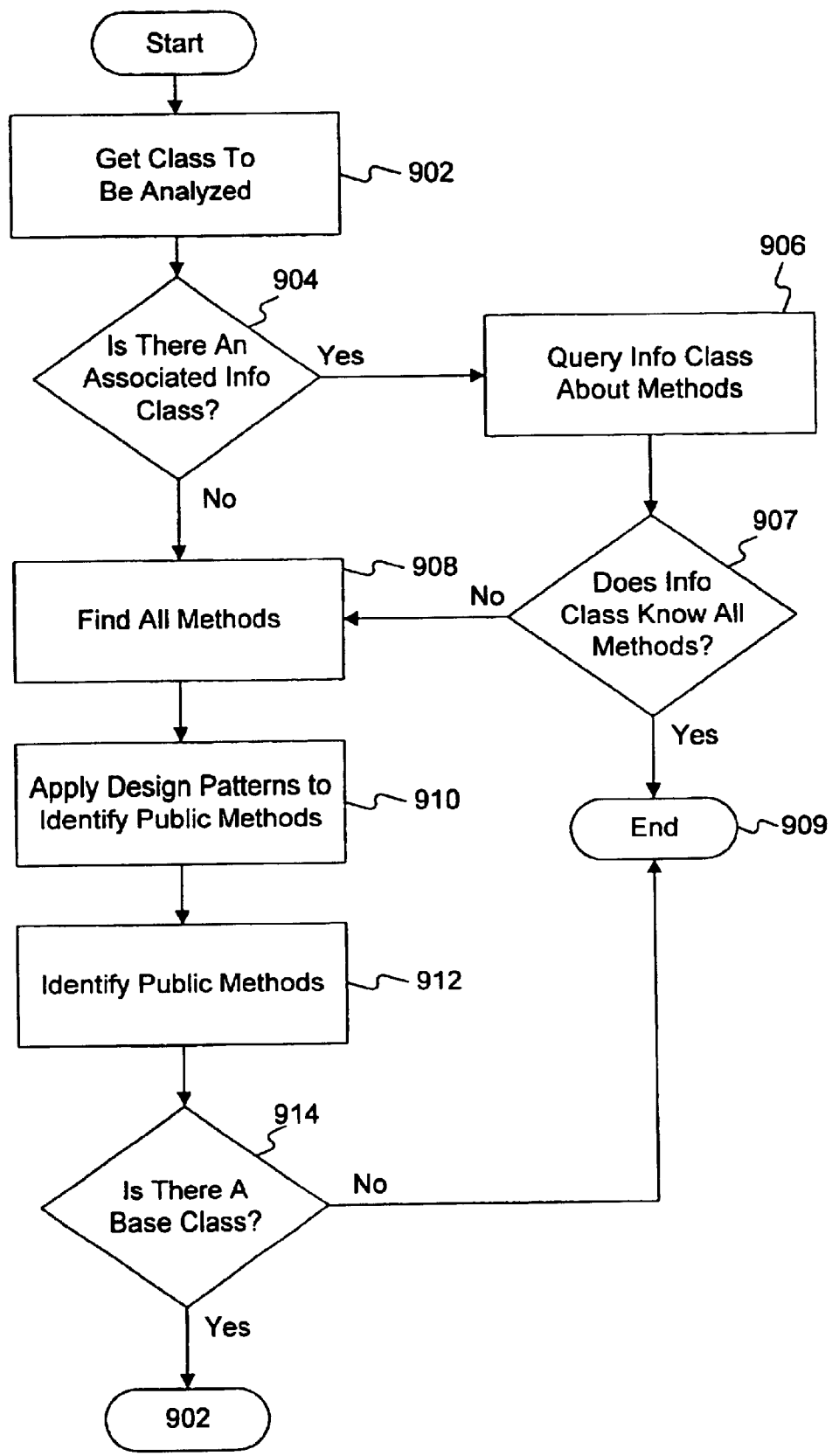
FIGS. 9–15 are flow diagrams of processes consistent with the present invention that are performed by an object evaluator consistent with the present that is used to help create the database bridge map.

FIG. 9 is a process flow diagram that illustrates the steps involved with identifying methods associated with a class which may include an information class invention. After the class to be analyzed is obtained (step 902), it is determined (step 904) whether an information (info) class, such as a component information class, is associated with the class to be analyzed exists.

If an associated component information class exists, the information class is queried about methods contained within the information class (step 906). It is determined whether the information class "knows," or includes, all methods associated with the class that is being analyzed (step 907). If it is determined that all methods are known to the information class, then the process of identifying methods associated with a class ends (step 909). If it is determined that all methods are not known to the information class, all methods associated with the class that is being analyzed are found. While any appropriate method may be used to find methods, a reflection process, is typically used to identify all methods associated with a class. As previously described, reflection involves studying different parts of a program, including the class that is being analyzed, at runtime to determine which methods, properties, and events are associated with the class.

After all methods are identified, design patterns are applied to identify public methods (step 910). The design patterns are typically standard design patterns that may be used to identify public methods, or a sub-set of methods which may be exported, that are associated with the class that is being analyzed. The public methods are then identified (step 912). Once the public methods are identified (step 912), it is determined whether there is a base class, or another class to be analyzed (step 914). When it is determined that the top-level base class has already been analyzed, the process of identifying methods is completed (step 909). If it is determined that there is a base class (step 914), the base class is obtained to be analyzed (step 902).

Figure 10:
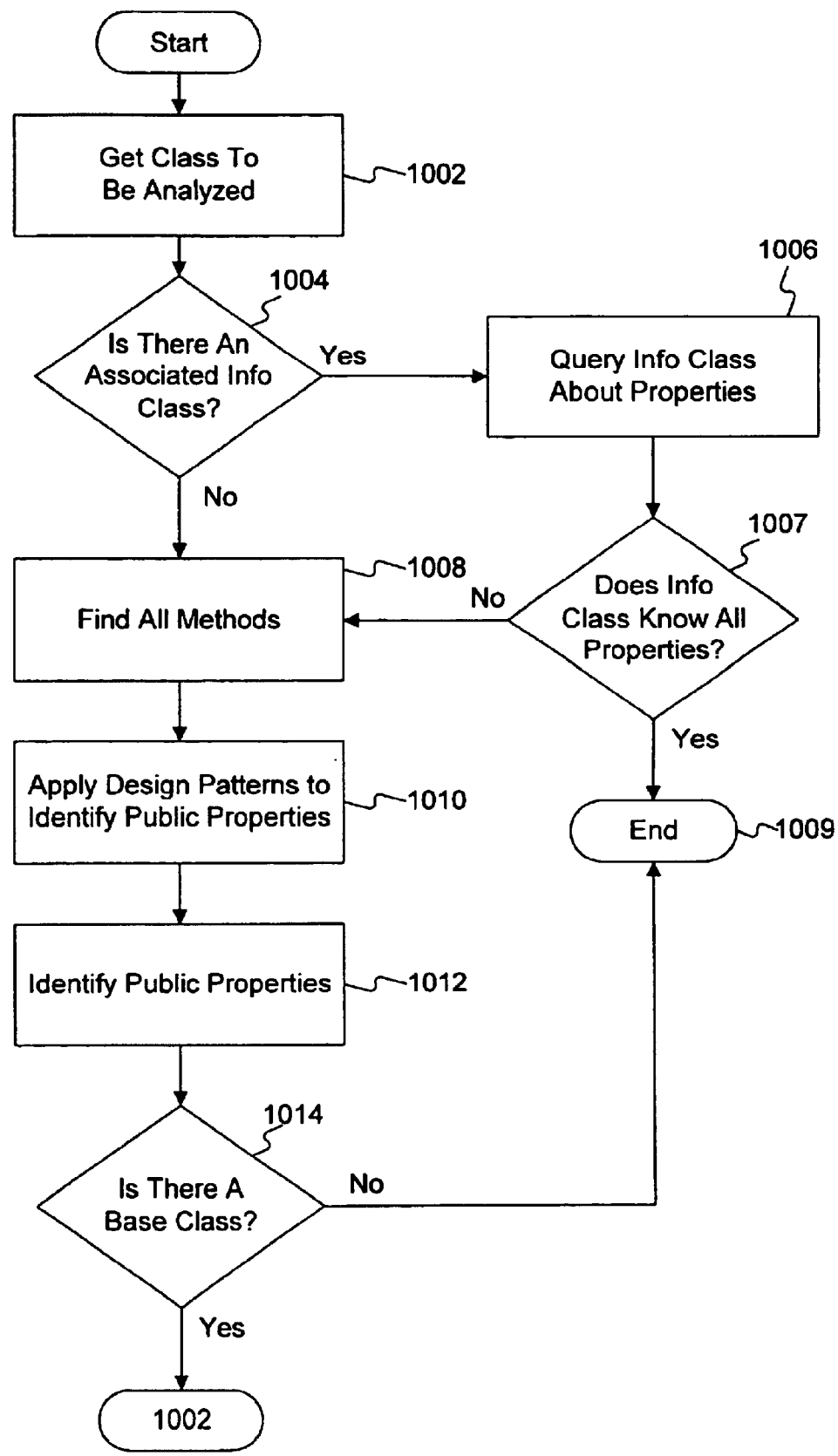

FIG. 10 is a process flow diagram that illustrates the steps for identifying properties associated with a class. Properties, which are generally named attributes associated with a class, may be read or written by calling appropriate methods which are associated with the class. Properties may include, but are not limited to, simple properties, boolean properties, and indexed properties.

After the class to be analyzed is obtained (step 1002), it is determined whether an information (info) class, such as a component information class, is associated with the class to be analyzed exists (step 1004).

If an associated component information class exists, the information class is queried about properties contained within the information class (step 1006). If the information class "knows," or includes, all properties associated with the class that is being analyzed, the process of identifying properties associated with a class ends (step 1009). If all properties are not known to the information class, all methods associated with the class that is being analyzed are found (step 1008). While any appropriate method may be used to find methods, a reflection mechanism is typically used to identify the methods associated with a class.

After all methods are identified, design patterns are applied to identify public properties (step 1010). As previously mentioned, properties may include simple properties, boolean properties, and indexed properties. Public properties are properties which may be exported to other classes. The steps associated with using design patterns to identify public simple properties is described in more detail with respect to FIG. 11, while the steps associated with applying design patterns to identify public boolean properties and public indexed properties is discussed in more detail below with reference to FIGS. 12 and 13, respectively. After the design patterns are applied (step 1010), the public properties are identified (step 1012).

After public properties are identified (step 1012), if there are no remaining base classes, i.e., the top-level base class has already been analyzed, the process of identifying properties ends (step 1009). If it is determined that a base class remains (step 1014), the base class is obtained as the class to be analyzed (step 1002).

Figure 11:
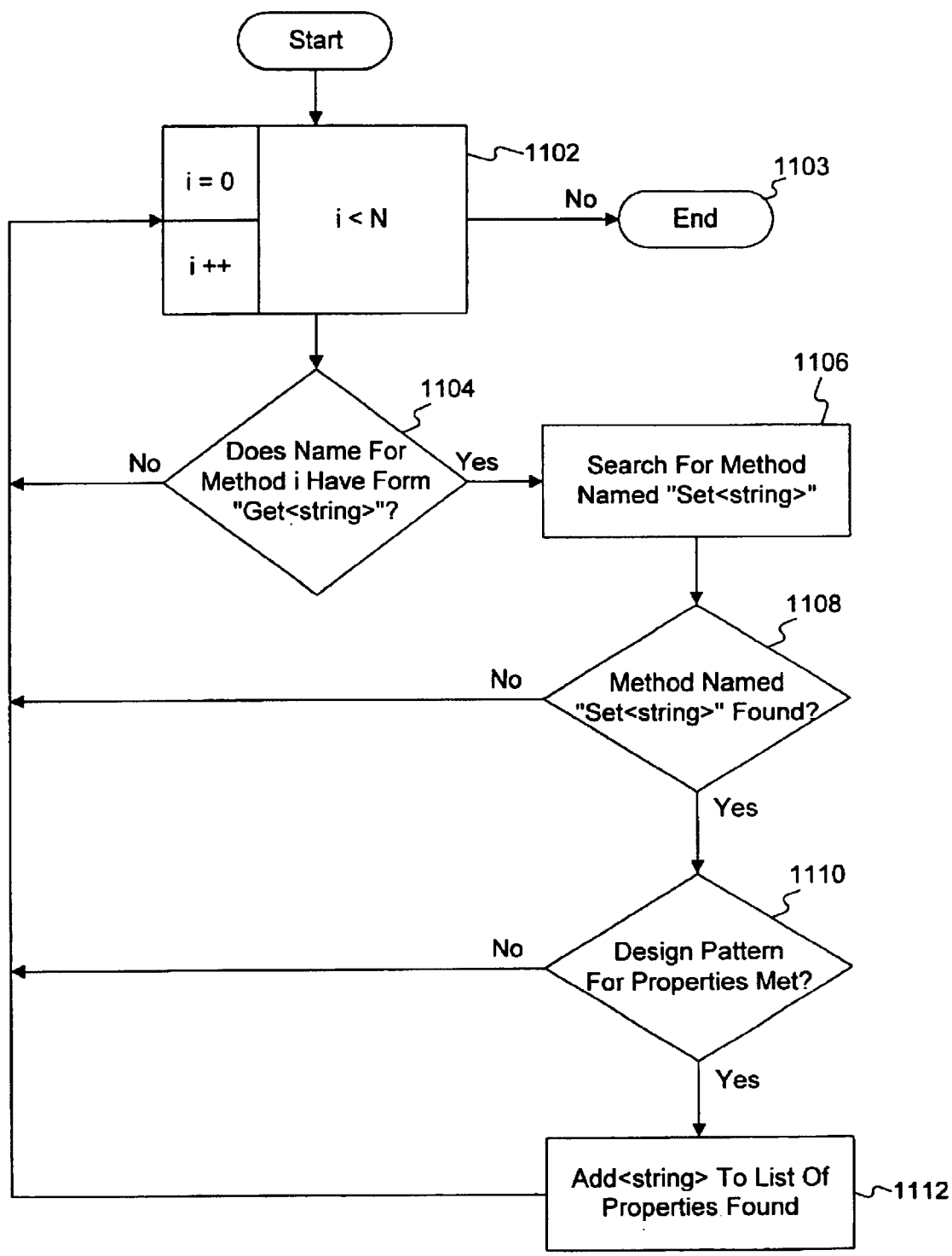

With reference to FIG. 11, the steps associated with applying design patterns to identify public simple read-write properties is described in accordance with an embodiment of the present invention. A simple read-write property is one type of simple property, and is generally identified by a "set" method and a "get" method. For example, a simple property "foo" may be identified, or located, by looking for "getFoo" and "setFoo" methods. Other simple properties include, but are not limited to, read-only properties and write-only properties.

When a process of applying design patterns to identify public simple read-write properties begins (step 1102), the process enters a loop where a variable "I" is incremented. Here, a counter is used to track the number of methods that are to be checked in the identification of public simple read-write properties. The loop loops through all methods "I" that may be associated with the class that is being analyzed. If there are no methods to be checked, or, alternatively, if all available methods have been checked, then the process of identifying simple read-write properties ends (step 1103). As mentioned above, a simple read-write property may typically be identified by a set method and a get method. The process determines (step 1104) whether method "I" has the form "get<string>," where "<string>" is generally the name of the 110 simple property that is to be located. If method "I" does not have the form "get<string>," the process flow loops back where "I," or a counter, is incremented (step 1102), and the next method, if any, is obtained.

If the method "I" does have the form "get<string>" (step 1104), a search is made for a method named "set<string>" (step 1106), where "<string>" is the same in both "get<string>" and "set<string>." It should be appreciated that any suitable algorithm may be employed to search for a method named "set<string>" which may be located in the same class as the method named "get<string>." It is determined whether a method named "set<string>" has been found (step 1108). If a method named "set <string>" has not been found, "I" is incremented (step 1102). It should be understood that when only a method named "get<string>" has been found, the property identified as "<string>" may be a read-only property. Alternatively, if a method named "set<string>" has been found, a determination is made as to whether the design pattern for a simple read-write property has been met (step 1110). Although the design pattern for a simple read-write property may take on any suitable form, the design pattern is such that "set<string>" returns a void and has one argument, while "get<string>" returns a result, which is of the same type as the argument to "set<string>," and has no arguments.

If the design pattern for the simple read-write property has not been met, process flow returns to the counter where "I" is incremented (step 1102). If the design pattern for the simple read-write property has been met, "<string>" is added to a list of all simple read-write properties found (step 1112). After "<string>" is added to the list of all simple read-write properties found, process flow returns to the counter where "I" is incremented (step 1102). Steps 1102 through 1112 are repeated until no more methods remain to be checked to determine if method "I" has the form "get<string>." When no more methods remain to be checked, then the process of finding simple read-write properties ends (step 1103).

Figure 12:
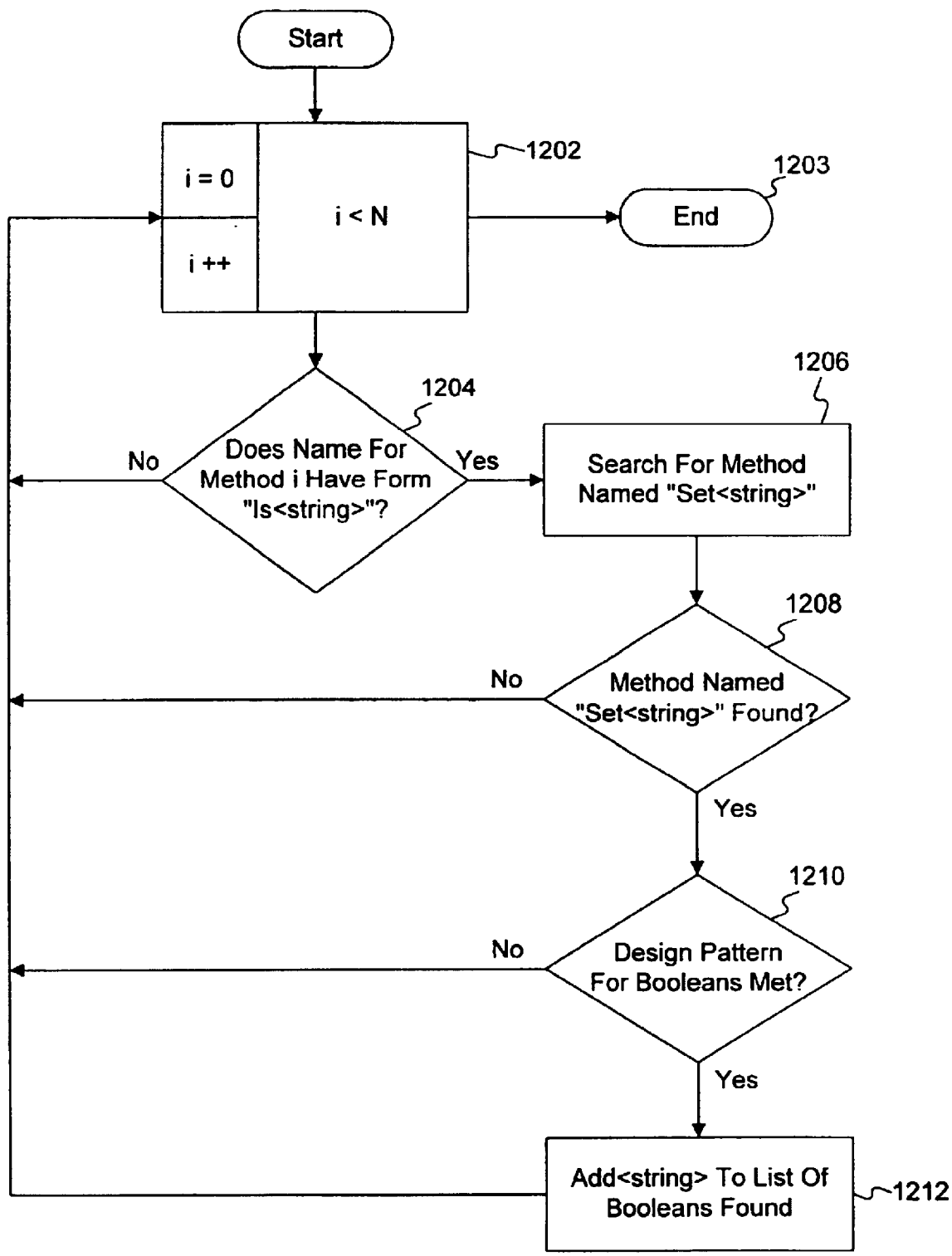

Referring next to FIG. 12, the steps associated with applying design patterns to identify public boolean properties is described. A boolean property may generally be identified by the presence of an "is" method and a corresponding "set" method. In some cases, a corresponding "get" method may also be present in addition to an "is" method. A boolean property, as for example "booleanprop," may be identified, or located, by looking for "is Booleanprop" and "setbooleanprop" methods.

A process of applying design patterns to identify public boolean properties begins by entering a counter loop (step 1202), where a variable "I" is incremented. The loop loops through all methods "I" that may be associated with the class that is being analyzed. If there are no methods to be checked, or if all available methods have been checked, the process of identifying boolean properties ends (step 1203). The process determines (step 1204) whether method "I" has the form "is <string>." If the method "I" does not have the form "is <string>," the process flow loops back to step 1202 where "I" is incremented.

If the method "I" has the form "is <string>" (step 1204), a search is made for a method named "set<string>," where "<string>" is the same in both "is <string>" and "set<string>" (step 1206). The process determines whether a method named "set<string>" has been found (step 1208). If a method named "set<string>" is not found, process flow returns to step 1202 where "I" is incremented. However, if a method named "set<string>" is found, it is determined whether the design pattern for a boolean property is met (step 1210). It should be appreciated that the design pattern for a boolean property may take on any suitable form. For example, the design pattern may be such that "set<string>" returns a void and has one boolean argument, while "is<string>" returns a boolean, and has no arguments.

If the design pattern for a boolean property is not met, then process flow returns to step 1202, where "I" is incremented. However, if the design pattern for a boolean property is met, "<string>" is added to a list of all boolean properties found (step 1212). After "<string>" is added to the list of all boolean properties found, process flow returns to step 1202 where "I" is incremented. Steps 1202 through 1212 are repeated until no more methods remain to be checked to determine if method "I" has the form "is <string>." When no more methods remain to be checked, then the process of finding boolean properties ends (step 1203).

Figure 13:
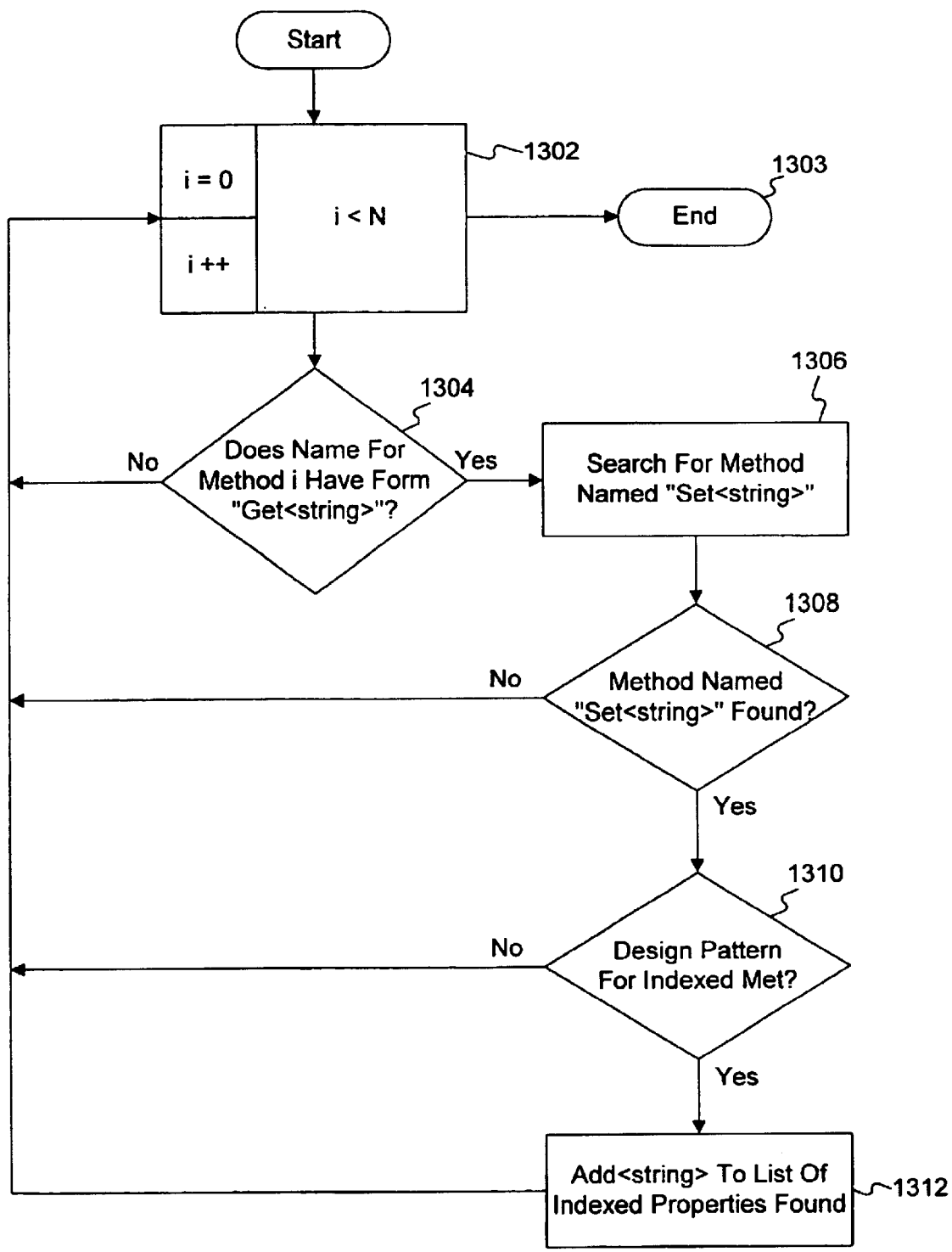

Referring next to FIG. 13, the steps associated with applying design patterns to identify public indexed properties is described. An indexed property is a property whose type is an array, and may generally be identified by a "set" method and a "get" method. For example, an indexed property "indexprop" may be identified, or located, by looking for "getindexprop" and "setindexprop" methods.

The process of applying design patterns to identify public indexed properties begins in a step 1302 where the process enters a counter loop where a variable "I" is incremented. The loop loops through all methods "I" that may be associated with the class that is being analyzed. If there are no methods to be checked, or, alternatively, if all available methods have been checked, the process of identifying indexed properties ends (step 1303). As discussed above, an indexed property may generally be identified by a set method and a get method. If the method "I" does not have the form "get<string>" (step 1304), process flow loops back to step 1302 where "I" is incremented.

If the method "I" does indeed have the form "get<string>" (step 1304), a search is made for a method named "set<string>" (step 1306), where "<string>" is the same in both "get<string>" and "set<string>." It should be appreciated that known processes may be employed to search for a method named "set<string>," which may be located in the same class as the method named "get<string>." The process determines whether a method named "set<string>" has been found (step 1308). If a method named "set<string>" has not been found (step 1308), process flow returns to step 1302 where "I" is incremented. Alternatively, if a method named "set<string>" has been found (step 1308), the process determines whether the design pattern for indexed properties are met (step 1310). Although the design pattern for indexed properties may take on any suitable form, the design pattern is such that "get<string>" returns a result and takes one integer argument, while "set<string>" returns a void, and takes two arguments, the first being an integer, and the second being of the same type as the result returned by "get<string>."

If the design pattern for indexed properties is not met, process flow returns to step 1302 where "I" is incremented. If the design pattern for the indexed properties is met, "<string>" is added to a list of indexed properties found (step 1312). After "<string>" is added to the list of all indexed properties found, process flow returns to step 1302 where "I" is incremented. Steps 1302 through 1312 are repeated until no more methods remain to be checked to determine if method "I" has the form "get<string>." When no more methods remain to be checked, then the process of finding simple properties ends (step 1303).

Figure 14:
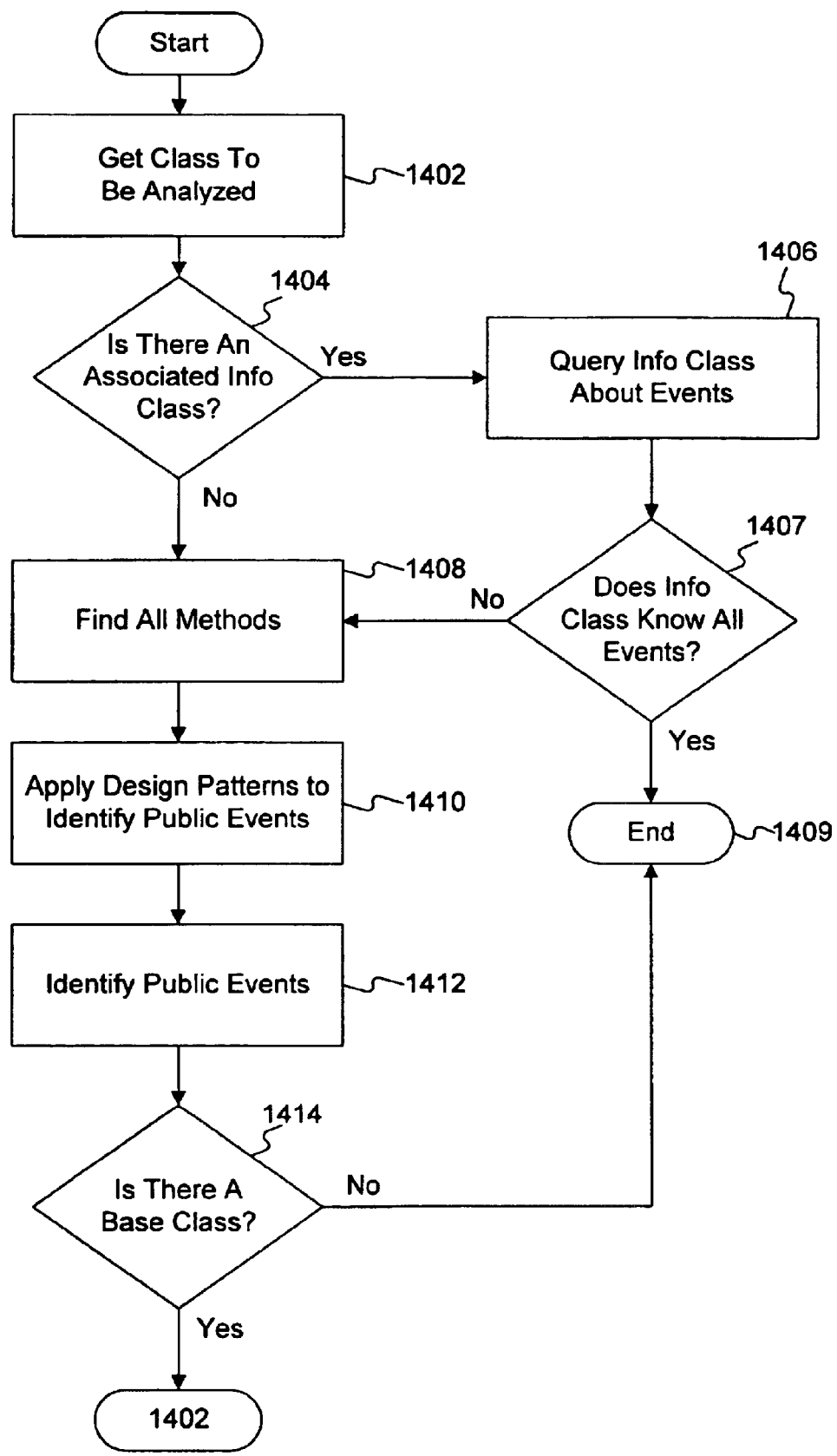

After methods and properties associated with a class are identified, the events associated with the class are then identified. FIG. 14 is a process flow diagram that illustrates the steps involved with identifying events associated with a class in accordance with an embodiment of the present invention. Events typically provide a way for one component to notify other components that something of interest has occurred. After the class to be analyzed is obtained (step 1402), if an associated component information class exists (step 1404), the information class is queried about events contained within the information class (step 1406). If it is determined that all events are known to the information class (step 1407), the process of identifying events associated with a class ends (step 1409). If it is determined that all events are not known to the information class, all methods associated with the class that is being analyzed are found (step 1408). While any appropriate process may be used to find methods, a reflection process is typically used to identify all events associated with a class.

After all methods are identified, design patterns are applied to identify public events (step 1410). The design patterns may be standard design patterns that may be used to identify public events that are associated with the class that is being analyzed. A public event is an event that is accessible to, e.g., may be exported to, classes other than the class with which the public event is associated. One suitable process of identifying public events will be described in more detail below with respect to FIG. 15. After the public events are identified (step 1412), the process determines whether there is a base class (step 1414). When it is determined that the top-level base class has already been analyzed, the process of identifying events ends (step 1409). If a base class exists (step 1414), the base class becomes the class to be analyzed, and the process flow returns to step 1402.

Figure 15:
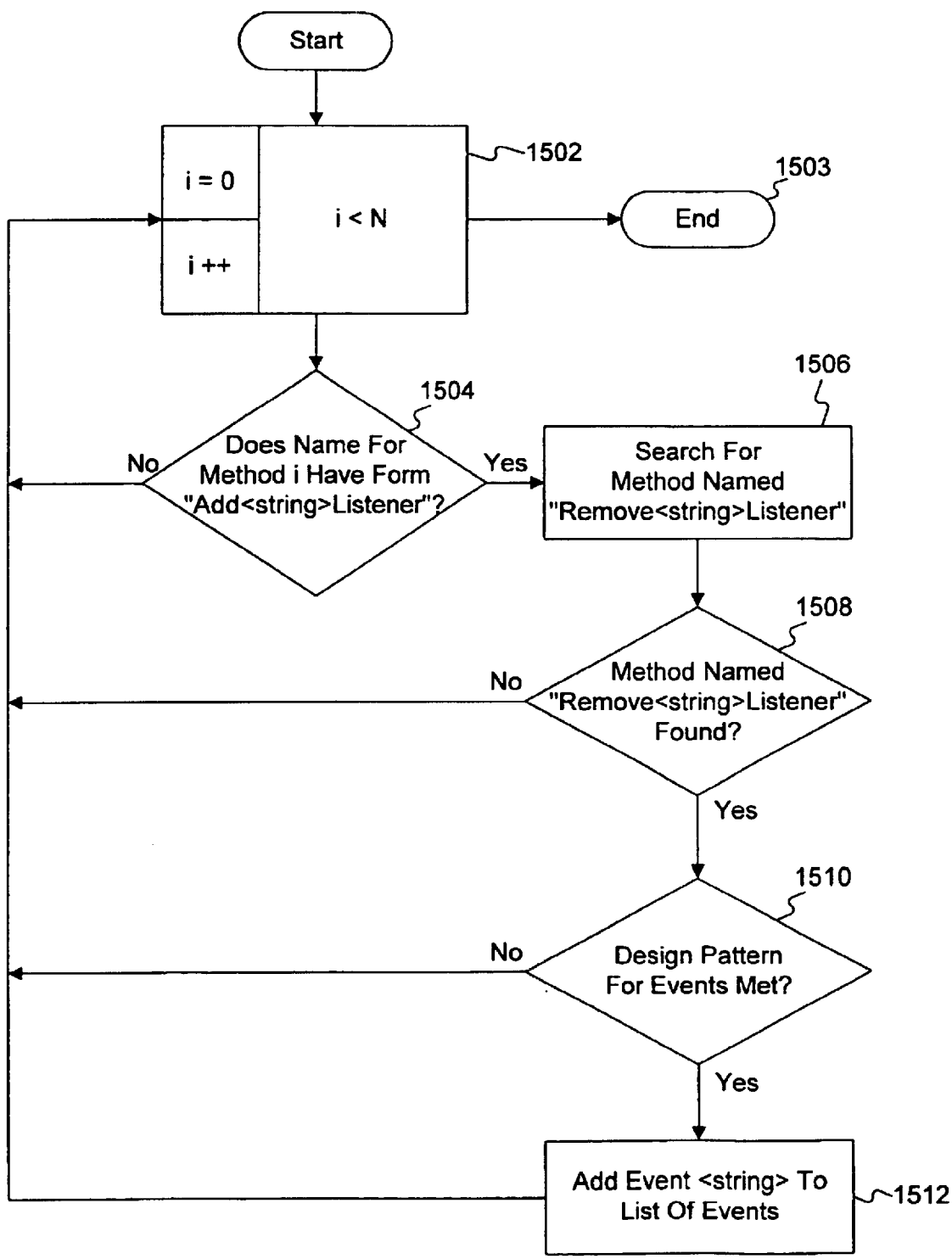

Referring next to FIG. 15, the steps associated with applying design patterns to identify public events will be described. The process of applying design patterns to identify public events begins in a counter loop where a variable "I" is incremented (step 1502). The loop loops through all methods "I" that may be associated with the class that is being analyzed. If there are no methods to be checked, or, alternatively, if all available methods have been checked, the process of identifying public events ends (step 1503). In general, an event may be identified by an add method and a remove method. If the method "I" does not have the form "add<string>listener" (step 1504), the process loops back to step 1502 where "I" is incremented.

If the method "I" does have the form "add<string>listener" (step 1504), a search is made for a method named "remove<string>listener" (step 1506), where "<string>" is the same in both "add<string>listener" and "remove<string>listener." It should be appreciated that known processes may be employed to search for a method named "add<string>listener." In step 1508, it is determined whether a method named "remove<string>listener" has been found. If a method named "remove<string>listener" has not been found (step 1508), process flow returns to step 1502 where "I" is incremented. Alternatively, if a method named "remove<string>listener" has been found (step 1508), the process determines whether the design pattern for a public event is met (step 1510). Although the design pattern for a public event may take on any suitable form, the design pattern is such that "add<string>listener" returns a void and has one argument, and "remove<string>listener" returns a void and has one argument which is of the same type as the argument to "add<string>listener."

If the design pattern for a public event has not been met (step 1510), then process flow returns to step 1502 where "I" is incremented. If the design pattern for the public event is met, "<string>" is added to a list of all public events found (step 1512). After "<string>" is added to the list of all public events found, process flow returns to step 1502 where "I" is incremented. Steps 1502 through 1512 are repeated until no more methods remain to be checked to determine if method "I" has the form "add<string>listener." When no more methods remain to be checked, then the process of finding public events ends (step 1503).

Although a few embodiments of the present invention have been described, it should be understood that the present invention may be embodied in many other forms without departing from the scope of the present invention. It will be understood by those skilled in the art that various changes and modifications may be made, and equivalents may be substituted for elements thereof without departing from the scope of the invention. Modifications may be made to adapt a particular element, technique, or implementation to the teachings of the present invention without departing from the scope of the invention. It should be appreciated that steps involved with analyzing classes or performing other processes consistent with the present invention may be reordered. Steps may also be removed or added without departing from the scope of the present invention. Although the described implementation is discussed specifically in terms of software, the invention may be implemented as a combination of hardware and software. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. Therefore, the described embodiments should be taken as illustrative and not restrictive, of the invention defined by the following claims and their scope of equivalents.

What is claimed is:

1. A computer-readable medium, operative to serve as a database interface, having instructions which when executed by a computer system, comprise the following steps:
   receiving a Structured Query Language (SQL) call at the computer system;
   mapping the SQL call to a general computer language programming call of a computer application; and
   executing the general computer language programming call to invoke functions of the computer application that correspond to functions specified by the SQL call.

2. The medium of claim 1 wherein said general computer language programming call is an Enterprise Java Bean (EJB) call.

3. The medium of claim 1 wherein the computer system is an application server.

4. The medium of claim 3 wherein the application server receives the SQL call from a client computer system.

5. The medium of claim 1 further comprising generating a database call to a database in response to executing the general computer language programming call.

6. The medium of claim 5 further comprising validating data operation prior to issuing an SQL call to a database.

7. The medium of claim 1 wherein the general computer programming language has components that generate database calls to a database in response to executing the general computer language programming calls; and further comprising:
   analyzing the components to determine the correspondence between the database elements and the elements of the components that access the database elements; and
   creating a database bridge map that identifies the correspondence.

8. The medium of claim 7 wherein the step of mapping utilizes the database bridge map to map the SQL call to a general programming language call.

9. The medium of claim 8 wherein the computer programming language is object-oriented and wherein said components are objects.

10. The medium of claim 9 wherein the step of analyzing the components comprises determining the methods that are invoked in the objects for use in determining said correspondence.

11. The medium of claim 10 wherein the methods are identified by searching for a method of the form <command prefix>XXX.

12. The medium of claim 10 wherein design patterns are used to map the received SQL call to the general programming call.

13. The medium of claim 12 wherein said general computer programming language is the Java programming language.

14. The medium of claim 11 wherein the <command prefix>is "get".

15. The medium of claim 11 wherein the <command prefix>is "set".

16. The medium of claim 1, wherein the SQL call received at the computer system is a first SQL database call and a column layout specified in the first SQL database call is different than a second SQL database call generated to a SQL database in response to executing the general computer language programming call.

17. A computer implemented method for accessing a database, comprising the steps of:

receiving a database protocol command for accessing elements in a database;

converting said database protocol command into a general computer programming language command for accessing said database; and accessing said database by executing said general computer programming language command.

18. The method of claim 17 wherein said database protocol command is received from a computer application executing on a first computer system.

19. The method of claim 18 wherein said computer application is in a different computer programming language than said general computer programming language.

20. The method of claim 19 wherein said step of converting comprises mapping said database protocol command to a general computer programming language command.

21. The method of claim 17 wherein said database protocol command is an SQL call.

22. The method of claim 21 wherein the general computer programming language is the JAVA programming language.

23. The method of claim 22 wherein said computer application is a Visual Basic computer application.

24. A computer readable medium, for accessing a database, comprising instructions which when executed by a computer, comprise the following steps:

exposing software components, in a first computer programming language, of an application server as database elements, said software components being operative for accessing said database;

receiving a database protocol command for accessing the database at the application server;

converting the database protocol command to a command syntax of the first computer programming language corresponding to at least a selected one of said software components; and accessing said database using said selected one of said software components.

25. The medium of claim 24 wherein said database protocol command is an SQL command.

26. The medium of claim 24 wherein the first computer programming language is the Java programming language.

27. The medium of claim 24 wherein the first computer programming language has components that generate database calls to a database in response to executing said selected one; and further comprising:

analyzing the components to determine the correspondence between the database elements and the elements of the components that access the database elements;

creating a database bridge map that identifies the correspondence.

28. The medium of claim 27 wherein the computer programming language is object-oriented and wherein said components are objects.

29. The medium of claim 28 wherein the step of analyzing the components comprises determining the methods that are invoked in the objects for use in determining said correspondence.

30. A system for interfacing between a computer and a database, comprising:

a command converter operative to convert a first database programming language call received from the computer to a general computer programming language call that corresponds to the database programming language call; and wherein said system is operative to execute said general computer programming language call and operative to generate a second database programming language call, which corresponds to the first database programming language call, to access a database.

31. The system of claim 30 wherein said system is an application server.

32. The system of claim 31 wherein said computer is a client computer that generates said first database programming language call.

33. The system of claim 32 wherein said database is accessed through a database server.

34. The system of claim 30 wherein said first and second database programming language calls are SQL calls.

35. The system of claim 34 wherein said first and second database programming language calls specify different column names.

36. The system of claim 35 wherein said programming language is the Java programming language.

37. The system of claim 34 wherein said general programming language is an object-oriented computer programming language.

38. The system of claim 30 wherein said command converter comprises a mapping module that maps said first database programming language call to said general computer programming language call.

* * * * *

UNITED STATES PATENT AND TRADEMARK OFFICE
CERTIFICATE OF CORRECTION

PATENT NO. : 6,889,227 B1
DATED : May 3, 2005
INVENTOR(S) : Graham Hamilton

It is certified that error appears in the above-identified patent and that said Letters Patent is hereby corrected as shown below:

Title page,
Item [74], *Attorney, Agent, or Firm*, "L.L.P" should read -- L.L.P. --.

Column 16,
Lines 63 and 65, "prefix>is" should read -- prefix> is --.

Signed and Sealed this

Nineteenth Day of July, 2005

JON W. DUDAS
*Director of the United States Patent and Trademark Office*